(12) United States Patent
Lu

(10) Patent No.: US 9,927,652 B2
(45) Date of Patent: Mar. 27, 2018

(54) DISPLAY PANEL AND DISPLAY APPARATUS

(71) Applicant: BOE Technology Group Co., Ltd., Beijing (CN)

(72) Inventor: Jiaoming Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/335,098

(22) Filed: Oct. 26, 2016

(65) Prior Publication Data

US 2017/0219876 A1 Aug. 3, 2017

(30) Foreign Application Priority Data

Jan. 28, 2016 (CN) .......................... 2016 1 0060419

(51) Int. Cl.
*G02F 1/1335* (2006.01)
*G02F 1/1343* (2006.01)

(52) U.S. Cl.
CPC .... *G02F 1/133514* (2013.01); *G02F 1/13439* (2013.01); *G02F 1/134309* (2013.01); *G02F 2201/52* (2013.01)

(58) Field of Classification Search
CPC ........... G02F 1/133514; G02F 1/13439; G02F 1/134309
See application file for complete search history.

(56) References Cited

U.S. PATENT DOCUMENTS

2008/0231779 A1* 9/2008 Shin ................... G02F 1/136213
349/106
2008/0239215 A1 10/2008 Chae
2009/0180063 A1* 7/2009 Hsieh ................ G02F 1/133514
349/108

FOREIGN PATENT DOCUMENTS

CN 101634772 A 1/2010

OTHER PUBLICATIONS

Feb. 2, 2018—(CN) First Office Action Appn 201610060419.5 with English Tran.

* cited by examiner

*Primary Examiner* — Joseph L Williams
(74) *Attorney, Agent, or Firm* — Banner & Witcoff, Ltd.

(57) ABSTRACT

Embodiments of the present disclosure provides a display panel and a display apparatus. The display panel includes: a substrate; a plurality of strip electrode groups, disposed on the substrate, each of the strip electrode groups including a first strip electrode and a second strip electrode; a liquid crystal layer, disposed on the first strip electrode and the second strip electrode; a color filter layer, disposed on the liquid crystal layer and including a plurality of color filter sublayers, wherein dielectric constants of at least two of color filter sublayers are different; and a plate electrode, disposed on the color filter layer.

20 Claims, 4 Drawing Sheets

DISPLAY PANEL AND DISPLAY APPARATUS

This application claims priority to and the benefit of Chinese Patent Application No. 201610060419.5 filed on Jan. 28, 2016, which application is incorporated herein in its entirety.

TECHNICAL FIELD

Embodiments of the present disclosure relate to a display panel and a display apparatus.

BACKGROUND

A Thin Film Transistor Liquid Crystal Display (TFT-LCD) is an important flat panel display device and can be divided into a vertical electric field type and a horizontal electric field type according to a direction an electric field for driving liquid crystal. The TFT-LCD of the vertical electric field type needs to form a pixel electrode on an array substrate and form a common electrode on a counter substrate (for example a color filter substrate), for example, a TN mode commonly used; while the TFT-LCD of the horizontal electric field type needs to form both a pixel electrode and a common electrode on the array substrate, for example, a Fringe Field Switching (FFS) mode, and an IPS mode.

SUMMARY

An embodiment of the present disclosure provides a display panel, including: a substrate; a plurality of strip electrode groups, disposed on the substrate, each of the strip electrode groups including a first strip electrode and a second strip electrode; a liquid crystal layer, disposed on the first strip electrode and the second strip electrode; a color filter layer, disposed on the liquid crystal layer and including a plurality of color filter sublayers, wherein dielectric constants of at least two of color filter sublayers are different; and a plate electrode, disposed on the color filter layer.

Another embodiment of the present disclosure provides a display apparatus including the above described display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
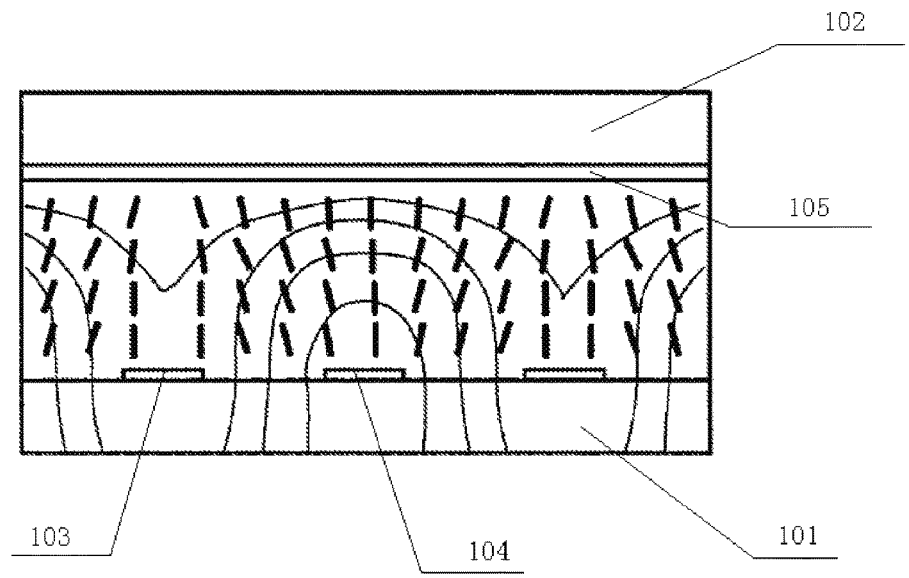
FIGS. 1 and 2 show structural schematic diagrams of a display panel in a related art.

Currently, a related TFT-LCD is researched and developed based on a TFT-LCD of the horizontal electric field type. As shown in FIG. 1, the TFT-LCD includes a strip pixel electrode 103 and a strip common electrode 104 formed on an array substrate 101, as well as a platy common electrode 105 formed on a color filter substrate 102; such a structure can avoid a phenomenon that liquid crystal molecules in a traditional TFT-LCD of the horizontal electric field type rotate under the actions of electric fields of the pixel electrodes 103 and the common electrodes 104 and a phenomenon of liquid crystal staggering, for example, a phenomenon of a black line (caused by liquid crystal staggering) between the pixel electrode 103 and the common electrode 104.

Figure 2:
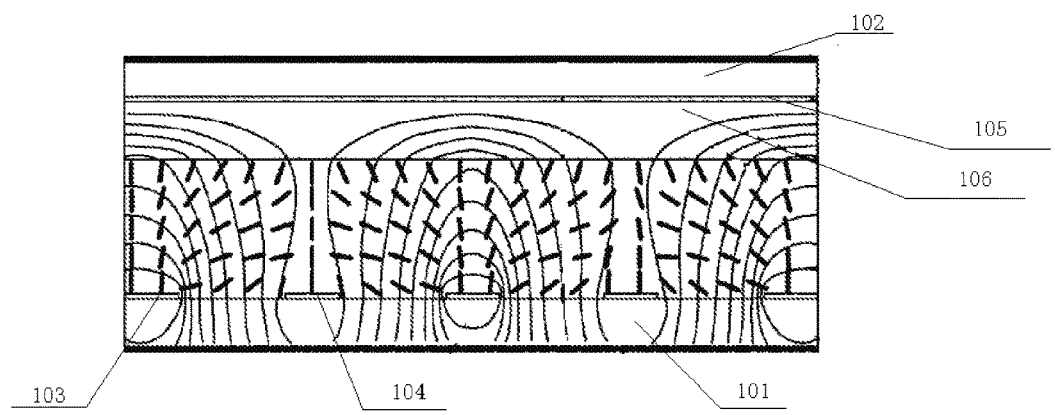

Based on the TFT-LCD structure mentioned above, a color filter layer 106 is further formed on the common electrode 105 of the color film substrate 102, as shown in FIG. 2, wherein the color filter layer 106 is generally made of an insulating material such as acrylic resin. By comparing equipotential line distribution diagrams in FIG. 1 and FIG. 2, it can be seen that transverse equipotential lines (equipotential lines) of the TFT-LCD of such structure in FIG. 2 are basically distributed in the color filter layer 106, and a ratio of vertical equipotential lines in a liquid crystal layer in FIG. 2 are increased, which is more favorable to for liquid crystal molecules to incline from a vertical state to an inclined state, thus improving transmittance of the TFT-LCD of such structure.

Brightness of liquid crystal display is related to an included angle between the liquid crystal molecules and light from a backlight; when the liquid crystal molecules are aligned, the brightness observed from different angles is different; and since emergent angles in different positions are different, included angles between the liquid crystal molecules and light are different. Thus, if the liquid crystal molecules in one pixel unit are aligned in a single direction or aligned slightly differently, the brightness of the pixel unit seen from different positions is different, that is a color shift phenomenon occurs. Therefore, the liquid crystal molecules in the liquid crystal display device have different deflection directions under the action of the electric field, the transmittance is also obviously improved, but the liquid crystal molecules have fewer alignment directions, and therefore, the color shift phenomenon occurs.

The technical solutions of the embodiments in this disclosure are clearly and completely described in combination with the drawings. It is obvious that the described embodiments are just a part but not all of the embodiments of the disclosure. It is noted that without conflict, the embodiments and features of the embodiments in this disclosure can be combined with one another. Based on the described embodiments herein, those skilled in the art can obtain other embodiment(s), without any inventive work, which should be within the scope of the disclosure.

Many specific details are described in the following description to fully understand the present disclosure, however, the present disclosure can be implemented in other manners different from those described herein, and therefore, the protection scope of the present disclosure is not limited to the specific embodiments disclosed below.

The embodiments of the present disclosure provide a display panel and a display apparatus comprising the display panel, capable of increasing alignment directions of liquid crystal molecules in the display panel.

Figure 3:
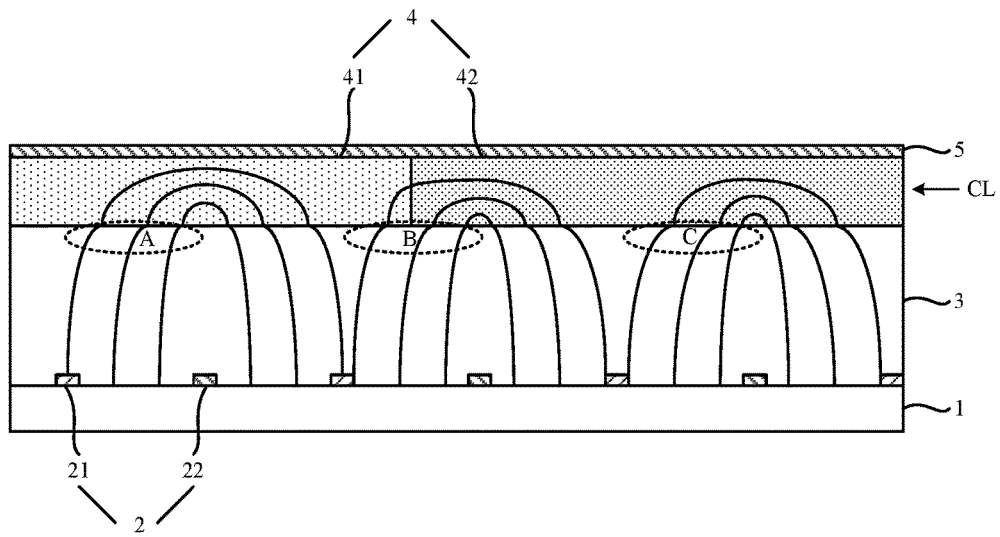
FIG. 3 shows a schematic diagram of electric field lines in a display panel according to an embodiment of the present disclosure.

As shown in FIG. 3, a display panel according to one embodiment of the present disclosure includes:

a substrate 1;

a plurality of strip electrode groups 2, disposed on the substrate 1, each of the strip electrode groups including a first strip electrode 21 and a second strip electrode 22;

a liquid crystal layer 3, disposed on the first strip electrode 21 and the second strip electrode 22;

a color filter layer CL, disposed on the liquid crystal layer 2 and including a plurality of color filter sublayers, wherein dielectric constants of at least two of the color filter sublayers are different; and a plate electrode 5, disposed on the color filter layer CL.

In the color filter layer CL, at least two of the color filter sublayers of different dielectric constants. Taking a first color filter sublayer 41 and a second color filter sublayer 42 adjacent to each other for example. A dielectric constant of the first color filter sublayer 41 is ∈1, and a dielectric constant of the second color filter sublayer 42 is ∈2 different from ∈1. A region where the first color filter sublayer 41 meets the liquid crystal layer 3 is a region A, a region where the first color filter sublayer 41, the second color filter sublayer 42 and the liquid crystal layer 3 meet with each other is a region B, and a region where the second color filter sublayer 42 meets the liquid crystal layer 3 is a region C.

Here, if it is assumed that ∈1<∈2, then a bending degree of electric field lines in the region A is smaller than that in the region C; in the region B, the electric field lines pass through the first color filter sublayer 41 with the dielectric constant ∈1, and then pass through the second color filter sublayer 42 with the dielectric constant ∈2; and therefore, the bending degree of the electric field lines in the region B is larger than that in the region A, and is smaller than that in the region C; that is, the bending degree of the electric field lines in the region B is between the bending degree of the electric field lines in the region A and the bending degree of the electric field lines in the region C.

Because the distribution of the electric field lines decides an alignment direction of liquid crystal moleculars, the alignment direction of the liquid crystal moleculars in the region A is a, the alignment direction of the liquid crystal moleculars in the region B is b and the alignment direction of the liquid crystal moleculars in the region C is c. Therefore, liquid crystal molecules in the liquid crystal layer can be deflected in at least three different alignment directions according to the present embodiment, thereby reducing a color shift phenomenon. And in the present embodiment, the distribution of the electric field lines formed by the electrodes is changed by the color filter layer without additionally arranging a dielectric layer, which can reduce a whole thickness of the display panel.

In the present embodiment, the first strip electrode 21 can be a pixel electrode, the second strip electrode 22 can be a common electrode; they are applied with different voltages, for example, voltages with opposite polarities, or one is applied with a non-zero voltage and the other has a voltage of zero.

It is noted that the electric field lines as shown in the diagrams may be bent between the liquid crystal layer 3 and the color filter layer CL, and here, it is only to show the difference of electric field distribution, and the electric field lines in practice can be continuous and smooth.

For example, the first strip electrodes 21 and the second strip electrodes 22 in the plurality of the strip electrode groups are disposed on the substrate 1 at intervals. The first strip electrodes 21 and the second strip electrodes 22 are disposed alternatively, such that each first strip electrode 21 is adjacent to two second strip electrodes 22, and each second strip electrode 22 is adjacent to two first strip electrodes 21, thereby making full use of the first strip electrodes 21 and the second strip electrodes 22 to form an electric field.

For example, the color filter layer CL includes a plurality of color filter sublayer groups 4, and each of the color filter sublayer groups 4 includes n color filter sublayers, and an i-th color filter sublayer having an i-th dielectric constant.

Where, 2≤i≤n.

For example, in an arrangement direction, dielectric constants of the n color filter sublayers can increase or decrease in sequence, or can be not arranged in sequence.

Figure 4:
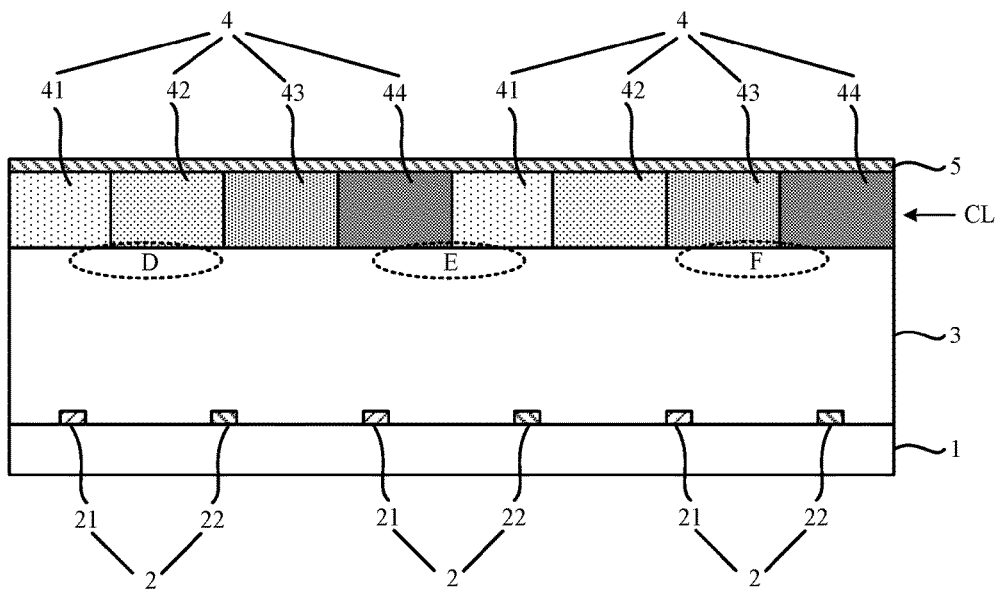
FIG. 4 shows a structural schematic diagram of a display panel according to an embodiment of the present disclosure.

As shown in FIG. 4, in a case that n=4; the four color filter sublayers are arranged in sequence, the dielectric constants of the respective color filter sublayers increase in sequence, that is, the dielectric constant of the first color filter sublayer 41 is ∈1, the dielectric constant of the second color filter sublayer 42 is ∈2, the dielectric constant of the third color filter sublayer 43 is ∈3, the dielectric constant of the fourth color filter sublayer 44 is ∈4, wherein ∈1<∈2<∈3<∈4.

In FIG. 4, two color filter sublayer groups 4 correspond to three strip electrode groups 2. That is, vertical projections of two continuous color filter sublayer groups 4 on the upper surface of the substrate are overlapped with vertical projections of each first strip electrode and each second strip electrode in three groups of strip electrodes on the upper surface of the substrate. In the example as shown in FIG. 4, the electric field lines of the first strip electrode group pass through the first color filter sublayer 41 and the second color filter sublayer 42, and a region where the corresponding liquid crystal layer meets the color filter layer is a region D; the electric field lines of the second strip electrode group pass through the fourth color filter sublayer 44 and the first color filter sublayer 41, and a region where the corresponding liquid crystal layer meets the color filter layer is a region E; the electric field lines of the third strip electrode group 2 pass through the third color filter sublayer 43 and the fourth color filter sublayer 44, and a region where the corresponding liquid crystal layer meets the color filter layer is a region F.

According to the above embodiment, it can be seen that the electric field lines passing through the color filter sublayers of different dielectric constants are different in distribution, and therefore, the distributions of electric field lines in the region D, region E and region F are different, such that the liquid crystal alignments in the liquid crystal layer corresponding to the region D, region E and region F are different, and further the liquid crystal molecules in the liquid crystal layer are deflected in at least three alignment directions, thereby reducing a color shift phenomenon.

For example, every x color filter sublayer groups correspond to y continuous strip electrode groups, where x≥1, y≥2 and x<y.

In the present embodiment, it is ensured that y strip electrode groups form at least three types of electric field distribution. For example, in FIG. 4, two color filter sublayer groups 4 correspond to three strip electrode groups 2, then three types of electric field distributions can be formed, and therefore, the liquid crystal molecules in the liquid crystal layer are deflected in three alignment directions. For another example, in FIG. 5, one color filter sublayer group 4 corresponds to three continuous strip electrode groups 2. That is, the vertical projection of the color filter layer group 4 on the upper surface of the substrate are overlapped with vertical projections of each first strip electrode and each second strip electrode in three groups of strip electrodes on the upper surface of the substrate correspondingly. One color filter sublayer group 4 include the color filter sublayers with four dielectric constants respectively. Then, the three strip electrode groups 2 can form different electric field distributions in regions G, H, I, J, K and L, that is, form 6 electric field distributions, and therefore, the liquid crystal molecules in the liquid crystal layer can be deflected in 6 alignment directions.

For example, each of the color filter sublayer groups 4 corresponds to n continuous groups of first strip electrodes and second strip electrodes, that is, n strip electrode groups 2.

Because each of the color filter sublayer groups includes n color filter sublayers, each of the color filter sublayer corresponds to one group of strip electrode 21 and second strip electrode 22. That is, vertical projection of each of color filter sublayer groups 4 on the upper surface of the substrate is overlapped with vertical projections of each first strip electrode and each second strip electrode in one strip electrode group on the upper surface of the substrate.

Figure 6:
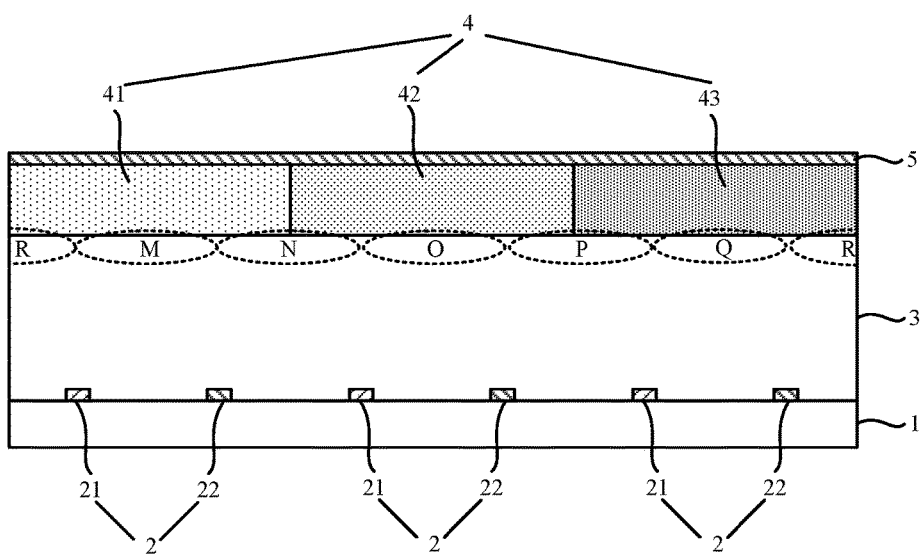
FIG. 6 shows a structural schematic diagram of a display panel according to a further embodiment of the present disclosure.

As shown in FIG. 6, n=3, three color filter sublayers correspond to three strip electrode groups 2. That is, the vertical projections of one color filter sublayer group 4 on the upper surface of the substrate is overlapped with vertical projections of each first strip electrode and each second strip electrode in the three strip electrode groups 2 on the upper surface of the substrate. The three groups of the strip electrodes can form different electric field distributions in regions M, N, O, P, Q and R, that is, form six electric field distributions, and therefore, the liquid crystal molecules in the liquid crystal layer can be deflected in 6 alignment directions.

For example, the respective color filter sublayers are equal in width.

According to the present embodiment, each electric field distribution is uniform, to ensure that the deflection alignment of liquid crystals are more uniform, thereby ensuring a more uniform relieving effect against color shift.

For example, each of the color filter sublayer groups 4 includes two color filter sublayers.

Figure 7:
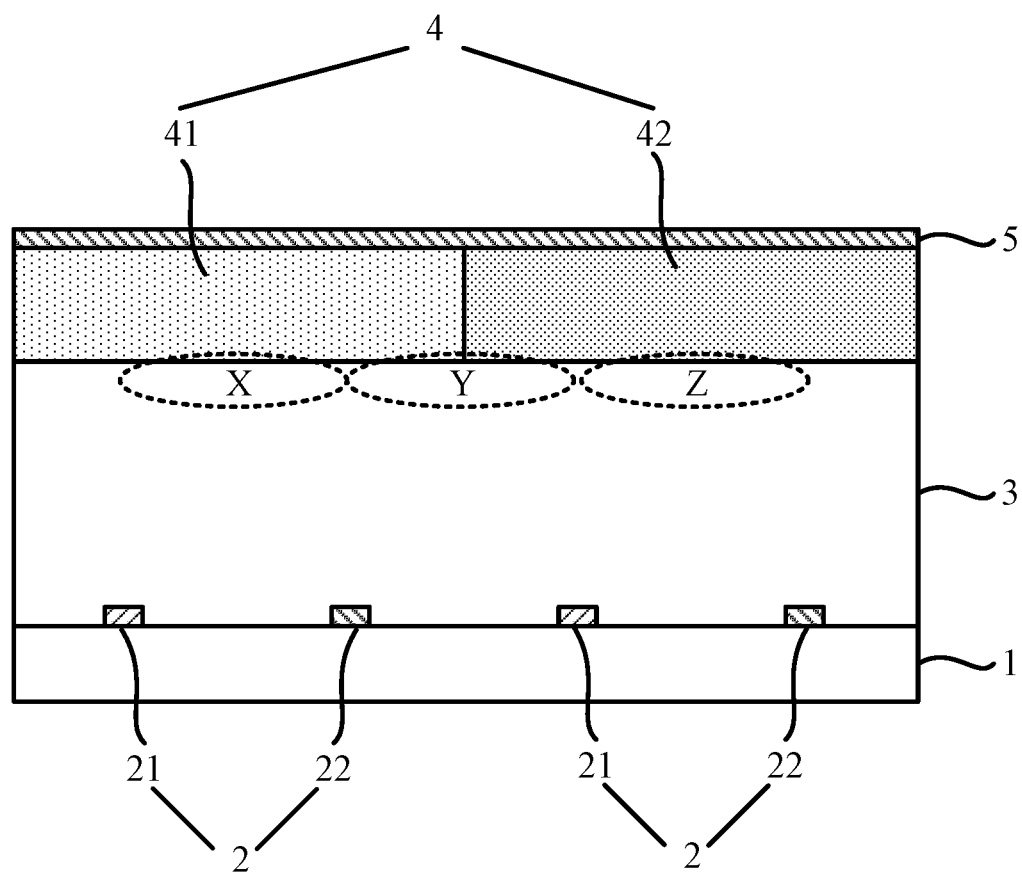
FIG. 7 shows a structural schematic diagram of a display panel according to yet another embodiment of the present disclosure.

As shown in FIG. 7, according to the present embodiment, two strip electrode groups 2 can form different electric field distributions in regions X, Y and Z, that is, form three types of electric field distributions, the color shift is relieved, and the structure is simple to arrange and easy to implement.

For example, a boundary where two adjacent color filter sublayers contact each other corresponds to a midpoint of the two adjacent groups of first strip electrode 21 and second strip electrode 22. That is, a vertical projection of the where two adjacent color filter sublayers contact each other on the upper surface of the substrate is located at a center of a vertical projection of an interval between two adjacent strip electrode groups on the upper surface of the substrate.

According to the present embodiment, three electric field distributions similar in width can be formed in regions corresponding to one group of first strip electrode 21 and second strip electrode 22, thereby improving uniformity.

Figure 5:
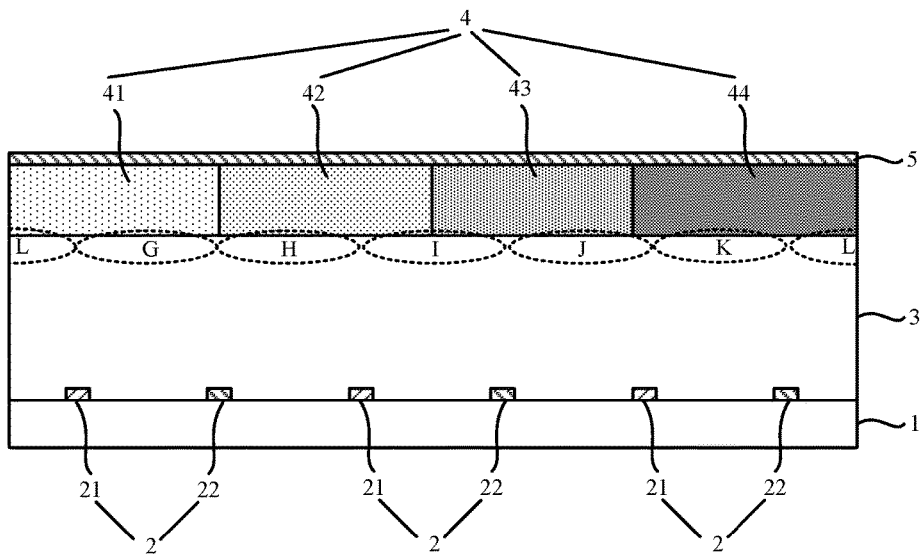
FIG. 5 shows a structural schematic diagram of a display panel according to another embodiment of the present disclosure.

For example, n≥3, and each of the color filter sublayer groups corresponds to y continuous strip electrode groups. As shown in FIG. 5, n=4; and as shown in FIG. 6, n=3; and each of color filter sublayer groups 4 corresponds to three strip electrode groups 2. In such case, less color filter sublayer groups can be disposed to ensure that the liquid crystal has more alignment directions, thereby ensuring simplification of a manufacturing process and increase of liquid crystal alignment directions as much as possible.

It is noted that in the embodiment mentioned above, one color filter sublayer group 4 does not necessarily correspond to colors of a plurality of sub pixels in one pixel unit. For example, in a case that the color filter layer contains a red color filter layer, a green color filter layer and a blue color filter layer, then in the embodiment as shown in FIG. 4, in a direction parallel with the upper surface of the substrate 1, the first color filter sublayer group 4 can include a red color filter layer, a green color filter layer, a blue color filter layer and a red color filter layer in sequence; and the second color filter sublayer group can include a green color filter layer, a blue color filter layer, a red color filter layer and a green color filter layer in sequence. That is, the cycle of the red color filter layer, the green color filter layer and the blue color filter layer is still met, while the color filter sublayers of the same color are different in dielectric constant, which can be realized by adding particles of different dielectric constants to the color filter layers of the same color.

For example, when each of the color filter sublayer groups 4 includes three color filter sublayers, the three color filter sublayers can be a red color filter layer, a green color filter layer and a blue color filter layer; when each of the color filter sublayer groups includes four color filter sublayers, the four color filter sublayers can be a red color filter layer, a green color filter layer, a blue color filter layer and a white color filter layer. Because it is relatively simple to set the dielectric constants of the color filter sublayers of different colors to be different, the process of arranging the color filter layers can be simplified according to the present embodiment.

The present disclosure further provides a display apparatus, including the display panel. The display apparatus, for example, further includes a backlight configured to provide light for the display panel.

For example, the display apparatus in the present embodiment can be electronic paper, a cell phone, a tablet computer, a television, a laptop, a digital photo frame, a navigator and any other product or part with a display function.

The technical solution of the present disclosure is described in detail in conjunction with drawings. Considering that, in a liquid crystal display of a horizontal electric field type in the related art, the liquid crystal molecules have less alignment directions, and a color shift phenomenon easily occurs. By the technical solution of the present disclosure, because the color filter sublayers of different dielectric constants is included in the color filter layer, the electric field distribution of the electric field lines merely passing through the color filter sublayer of a first dielectric constant is the first type and the liquid crystal is driven to deflect to a first alignment direction; the electric field distribution of the electric field lines merely passing through the color filter sublayer of a second dielectric constant is the second type and the liquid crystal is driven to deflect to a second alignment direction; the electric field distribution of the electric field line passing through the color filter sublayers of the first and second dielectric constant is the third type and the liquid crystal is driven to deflect to a third alignment direction. Therefore, the liquid crystal molecules in the liquid crystal layer can be deflected in at least three alignment directions, thereby reducing a color shift phenomenon.

It is noted that in the drawings, the size of the layers and regions may be exaggerated for the sake of clear illustration.

It is understandable that when an element or layer is referred to as "on" another element or layer, it can be directly on the another element or a middle layer may exist. In addition, when an element or layer is referred to as "under" another element or layer, it can be directly under the another element or more than one middle layer or element may exist. In addition, it is further understandable that when a layer or element is referred to as "between" two layers or two elements, it can be the only layer or element between the two layers or two elements, or more than one middle layer or element may exist. The similar reference signs indicate the similar elements throughout the description.

In the present disclosure, the terms "first", "second" . . . "i-th" are intended to describe merely rather than being understood as indication or imply of relative importance. The term "a plurality of" indicates two or more unless otherwise defined in particular.

Although the embodiment of the disclosure has been described above in great detail with general descriptions and specific embodiments, on the basis of the embodiment of the disclosure, various changes and improvements may be made, which is apparent to those skilled in the art. Therefore, all such changes and improvements without departing from the spirit of the disclosure are within the scope of the claims of the disclosure.

The application claims priority of Chinese Patent Application No. 201610060419.5 filed on Jan. 28, 2016, the disclosure of which is incorporated herein by reference in its entirety as part of the present application.

The invention claimed is:

1. A display panel, comprising:
a substrate;
a plurality of strip electrode groups, disposed on the substrate, each of the strip electrode groups including a first strip electrode and a second strip electrode;
a liquid crystal layer, disposed on the first strip electrode and the second strip electrode;
a color filter layer, disposed on the liquid crystal layer and including a plurality of color filter sublayers, wherein dielectric constants of at least two of color filter sublayers are different; and
a plate electrode, disposed on the color filter layer, wherein, the plate electrode is located on a side of the color filter layer opposite to the liquid crystal layer.

2. The display panel according to claim 1, wherein the plurality of color filter sublayers are divided into a plurality of color filter sublayer groups, each of the color filter sublayer groups including n color filter sublayers with different dielectric constants, where $n \geq 2$.

3. The display panel according to claim 2, wherein vertical projections of the color filter sublayers of every x color filter sublayer group(s) on an upper surface of the substrate are overlapped with vertical projections of each first strip electrode and each second strip electrode in y strip electrode groups on the upper surface of the substrate correspondingly, where $x \geq 1$, $y \geq 2$ and $x < y$.

4. The display panel according to claim 3, wherein a vertical projection of each color filter sublayer on the upper surface of the substrate is overlapped with vertical projections of the first strip electrode and the second strip electrode of one of the strip electrode groups on the upper surface of the substrate correspondingly.

5. The display panel according to claim 4, wherein the respective color filter sublayers are equal in width.

6. The display panel according to claim 5, wherein each of the color filter sublayer groups includes two of the color filter sublayers.

7. The display panel according to claim 6, wherein a vertical projection of a boundary where two adjacent ones of the color filter sublayers is in contact with each other on the upper surface of the substrate is located at a center of a vertical projection of an interval between two adjacent ones of the strip electrode groups on the upper surface of the substrate.

8. The display panel according to claim 2, wherein $y=3$.

9. The display panel according to claim 2, wherein in an arrangement direction, dielectric constants of the n color filter sublayers in each color filter sublayer groups increase in sequence.

10. The display panel according to claim 2, wherein vertical projections of every two of the color filter sublayer groups on an upper surface of the substrate are overlapped with vertical projections of each first strip electrode and each second strip electrode in three of the strip electrode groups on the upper surface of the substrate correspondingly.

11. The display panel according to claim 10, wherein in an arrangement direction, dielectric constants of the n color filter sublayers in each color filter sublayer groups increase in sequence.

12. The display panel according to claim 2, wherein the first strip electrodes and the second strip electrodes in the plurality of strip electrode groups are disposed on the substrate alternately.

13. The display panel according to claim 3, wherein $n \geq 3$, and vertical projections of each of the color filter sublayer groups are overlapped with vertical projections of each first strip electrode and each second strip electrode in y strip electrode groups on the upper surface of the substrate correspondingly.

14. The display panel according to claim 13, wherein in an arrangement direction, dielectric constants of the n color filter sublayers in each color filter sublayer groups increase in sequence.

15. The display panel according to claim 3, wherein the first strip electrodes and the second strip electrodes in the plurality of strip electrode groups are disposed on the substrate alternatively.

16. The display panel according to claim 1, wherein the respective color filter sublayers are equal in width.

17. The display panel according to claim 16, wherein a vertical projection of a boundary where two adjacent ones of the color filter sublayers is in contact with each other on an upper surface of the substrate is located at a center of a vertical projection of an interval between two adjacent ones of the strip electrode groups on the upper surface of the substrate.

18. The display panel according to claim 1, wherein the first strip electrodes and the second strip electrodes in the plurality of strip electrode groups are disposed on the substrate alternately.

19. A display apparatus, comprising the display panel according to claim 1.

20. The display panel according to claim 1, wherein the first strip electrode is a pixel electrode, the second strip electrode is a common electrode.

* * * * *